Dec. 16, 1958  S. J. TEMPLE  2,864,572
AIRCRAFT HOLD-DOWN UNIT
Filed March 31, 1955
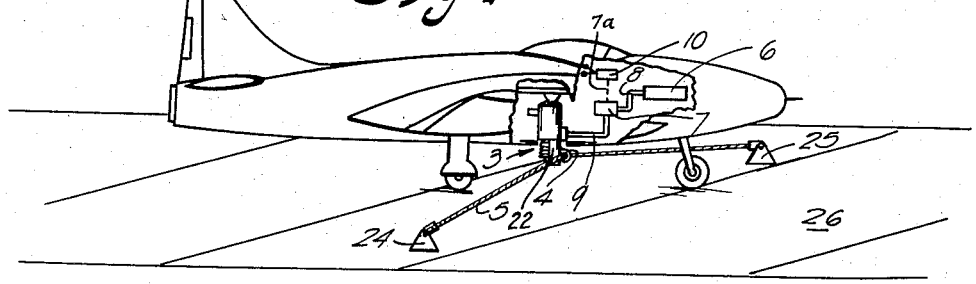
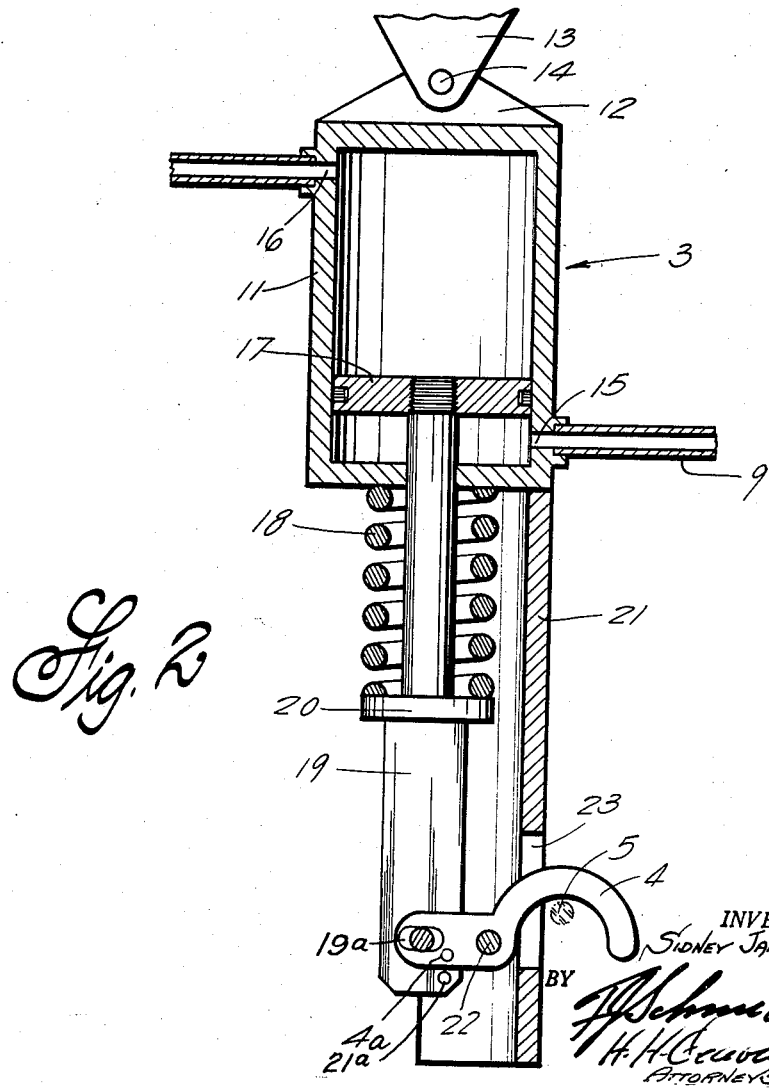
INVENTOR.
SIDNEY JAMES TEMPLE
BY
ATTORNEYS

United States Patent Office 2,864,572
Patented Dec. 16, 1958

2,864,572

AIRCRAFT HOLD-DOWN UNIT

Sidney James Temple, Harrisburg, Pa.

Application March 31, 1955, Serial No. 498,460

2 Claims. (Cl. 244—110)

(Granted under Title 35, U. S. Code (1952), sec. 266)

The invention described herein may be manufactured and used by or for the Government of the United States of America for governmental purposes without the payment of any royalties thereon or therefor.

The present invention relates to a novel and improved aircraft hold-down device and more particularly to a novel and improved hold-down unit which is effective in use, automatic in operation, and relatively simple in construction.

When various types of aircraft and the like are not in use, it often becomes necessary and desirable to fasten them down securely to their landing strip or platform or other supporting surface. This is particularly desirable where the aircraft rests on the flight deck of an aircraft carrier during or on the approach of bad weather. In the past aircraft have ordinarily been secured by means of chocks and/or hand operated tie-downs or reels which oftentimes, particularly during rough sea carrier operations, must remain fastened until immediately prior to a take-off. Due to ever present human errors in signal techniques between the pilot and the signal officer, take-offs are often attempted while one or more tie-down cables are still secured. As a result prior methods and apparatus which have been used heretofore have caused various mishaps which have resulted in appreciable loss and injury to deck personnel and equipment as well as the pilots and other occupants of the aircraft.

It is a principal object of the present invention to provide a novel and improved aircraft hold-down device.

It is a further object of the present invention to provide a novel and improved hold-down unit which is automatically actuated or released depending on the readiness of the aircraft for movement or flight.

Other objects and many of the attendant advantages of this invention will be readily appreciated as the same becomes better understood by reference to the following detailed description when considered in connection with the accompanying drawings wherein:

Figure 1 is a perspective view of a preferred embodiment of the hold-down unit of the present invention mounted in an aircraft.

Figure 2 is an enlarged cross sectional view of the hold-down unit.

In general, the improved apparatus of the present invention for restraining movement of the aircraft relative to its supporting surface includes a restraining cable affixed to the supporting surface, a hook-shaped element carried by the aircraft for at times engaging the restraining cable, and hydraulic means responsive to actuation of the brake mechanism of the aircraft for controlling operation of the hook-shaped element. It has been found that hold-down units of this kind though relatively simple in construction provide improved reliability and effectiveness in use.

A preferred embodiment of the present invention is illustrated in Figures 1 and 2 of the drawing. As shown therein the hold-down unit, which is generally designated in the drawing by reference numeral 3, is preferably pivotably attached to any suitable part of the frame of the aircraft such that its lower extremity projects outwardly and downwardly therefrom. As will be more apparent hereinafter, the hook-shaped element 4 of the hold-down unit is adapted to engage or disengage the restraining cable 5 which extends between the conventional points of securement on the landing strip or platform for the aircraft. The hydraulic fluid source 6 which is also positioned in the aircraft in any suitable portion thereof is preferably connected to the hold-down unit 3 through the valve mechanism 7 by means of the fluid supply lines 8 and 9.

The mechanism 7 as will be more apparent hereinafter is in turn operatively connected to and controlled by the parking brake mechanism 10 of the aircraft by means of any suitable conventional coupling device or lever 7a. In this way as will be more apparent hereinafter control of the hold-down unit is automatically operated in conjunction with operation of the parking brake of the aircraft.

Referring now to Figure 2 of the drawing for the details of the hold-down unit, as indicated heretofore the cylinder or the like 11 is preferably pivotably secured to the frame of the aircraft in any suitable manner such as by means of the flange elements 12 and 13 and the pin member 14. The port 15 at the base of the cylinder 11 connects the cylinder with the fluid supply line 9 and port 16 adjacent the top of the cylinder vents it to the atmosphere. The piston 17 in the cylinder is preferably normally biased towards its lowermost position in the cylinder by means of the helical spring element 18 which encircles the piston rod 19 between the exterior base surface of the cylinder and the abutment 20 on the piston rod. The semicylindrical member 21 which is secured to the base of the cylinder and which extends downwardly therefrom partially houses the hook-shaped element 4 which is pivotably secured to the member 21 preferably by means of the pin member 22. One extremity of the hook shaped element 4 is also pivotably connected through the oblong aperture 19a to the piston rod 19 whereas its opposite hooked extremity projects through the elongated aperture 23 in the semicylindrical housing 21. The aperture 4a through the hook-shaped element 4 and the complementary apertures 21a through the housing 21 provide a convenient means for locking the hook 4 in its closed position with respect to the retaining cable 5 when it is so desired.

The nature of the retaining cable 5 between the points of securement 24 and 25 on the landing strip or platform 26 for the aircraft has been indicated heretofore. Although use of a horrizontally disposed retaining cable similar to that which is disclosed herein is preferred, it is to be understood that any other suitable type of retaining cable which is adapted to cooperate with the aircraft carried hold-down unit 3 such as a simple vertical direct tie-down cable could be used without departing from the spirit or scope of the present invention.

In operation the hook element 4 due to the bias produced by the spring element 18 normally occupies its open disengaged position with respect to the retaining cable 5. When the aircraft is taxied or moved to the place where it is to be left or parked, the cable 5 is positioned such that the cable 5 may be engaged by the hook element 4 when the parking mechanism 10 of the aircraft is activated and the valve mechanism 7 is operated to allow fluid from the fluid source 6 to drive the piston 17 to its upper position against the bias of the spring element 18. In this way undue motion or movement of the aircraft relative to the landing strip or platform is effectively limited or eliminated. On release of the brake mechanism 10 of the aircraft the hook element 4 automatically permits the cable 5 to fall away and the aircraft to be moved with respect to its supporting surface or platform 26.

Take-offs in rough sea carrier operations are also materially enhanced by use of the improved hold-down device of the present invention. More specifically the aircraft may be securely positioned on the proper portion or area of the flight deck of the carrier until immediately prior to the take-off operation when the parking mechanism is released. In this way as indicated heretofore dependence of the precarious take-off operation on signal communications between the deck personnel and the pilot of the aircraft is wholly eliminated.

Inasmuch as the specific details of the device 7 for interlocking operations of the parking mechanism and the hold-down device may take a great variety of different forms and inasmuch as it in itself forms no part of the present invention, a full description of the same has been omitted for the sake of simplicity.

Although the hold-down apparatus of the present invention is particularly useful in securing various types of aircraft and the like in place, it is to be understood that it could also be used to tie down any other suitable object without departing from the spirit or scope of the invention.

Obviously many modifications and variations of the present invention are possible in the light of the above teachings. It is therefore to be understood that within the scope of the appended claims the invention may be practiced otherwise than as specifically described.

What is claimed is:

1. In combination with an aircraft having a parking brake mechanism, apparatus for restraining movement of the aircraft relative to a supporting surface and comprising a restraining cable affixed to the supporting surface; a cylinder secured to the aircraft; a piston operatively positioned in the cylinder; hook means operatively connected to the piston for at times engaging the retaining cable; and means operatively associated with said piston and responsive to the operations of the brake mechanism of the aircraft for controlling movement of the piston in the cylinder.

2. In combination with an aircraft having a parking brake mechanism, apparatus for restraining movement of the aircraft relative to a supporting surface and comprising a restraining cable affixed to the supporting surface; a cylinder secured to the aircraft; a piston operatively positioned in the cylinder; hook means operatively connected to the piston for at times engaging the retaining cable; means for normally biasing the piston toward a position within its cylinder such that the hook means normally does not engage the cable; and means operatively associated with said piston and responsive to the operations of the brake mechanism of the aircraft for controlling movement of the piston in the cylinder.

References Cited in the file of this patent

UNITED STATES PATENTS

| 2,347,847 | Schnell | May 2, 1944 |
| 2,403,456 | Pitcairn | July 9, 1946 |

FOREIGN PATENTS

| 603,030 | Great Britain | June 8, 1948 |